United States Patent
Li et al.

(10) Patent No.: US 7,985,503 B2
(45) Date of Patent: Jul. 26, 2011

(54) METHOD FOR PREPARING SPHERICAL NICKELOUS HYDROXIDE WHICH IS DOPPED AND MULTIPLE METAL OXIDES, AND LITHIUM ION SECONDARY BATTERY

(75) Inventors: Long Li, Guangdong (CN); Can Ren, Guangdong (CN)

(73) Assignee: Shenzhen Bak Battery Co., Ltd, Guangdong (CN)

( * ) Notice: Subject to any disclaimer, the term of this patent is extended or adjusted under 35 U.S.C. 154(b) by 721 days.

(21) Appl. No.: 11/922,908

(22) PCT Filed: Jun. 27, 2005

(86) PCT No.: PCT/CN2005/000931
§ 371 (c)(1),
(2), (4) Date: Dec. 27, 2007

(87) PCT Pub. No.: WO2007/000075
PCT Pub. Date: Jan. 4, 2007

(65) Prior Publication Data
US 2010/0108938 A1    May 6, 2010

(51) Int. Cl.
*H01M 4/13* (2010.01)
(52) U.S. Cl. .............. 429/231; 252/182.1; 252/518.1; 423/419.1; 423/594.3; 429/223; 429/231.1; 429/231.95; 501/94
(58) Field of Classification Search .......... 252/182.1; 423/419.1, 549.19, 594.3; 429/223, 231, 429/231.1, 231.95; 501/94
See application file for complete search history.

(56) References Cited

U.S. PATENT DOCUMENTS

| | | | | |
|---|---|---|---|---|
| 4,980,080 A * | 12/1990 | Lecerf et al. | | 252/182.1 |
| 5,281,494 A * | 1/1994 | Ettel et al. | | 429/223 |
| 5,824,283 A * | 10/1998 | Babjak et al. | | 423/594.19 |
| 5,861,131 A * | 1/1999 | Wakao | | 423/594.19 |
| 6,015,538 A * | 1/2000 | Babjak et al. | | 423/594.3 |
| 6,197,273 B1 * | 3/2001 | Nagano et al. | | 423/419.1 |
| 6,258,483 B1 * | 7/2001 | Abe | | 429/223 |
| 6,306,787 B1 * | 10/2001 | Sato et al. | | 501/94 |
| 6,358,648 B2 * | 3/2002 | Hayashi et al. | | 429/223 |
| 6,849,208 B1 * | 2/2005 | Stoller et al. | | 252/519.1 |
| 2010/0108938 A1 * | 5/2010 | Li et al. | | 252/182.1 |

FOREIGN PATENT DOCUMENTS

| | | |
|---|---|---|
| CN | 1075697 | 9/1993 |
| CN | 1107442 | 8/1995 |
| CN | 1195897 | 10/1998 |
| JP | 2002-343355 | 11/2002 |
| JP | 2004-047180 | 2/2004 |
| WO | WO00/39865 A1 * | 7/2000 |

* cited by examiner

*Primary Examiner* — Mark Kopec
*Assistant Examiner* — Khanh Tuan Nguyen
(74) *Attorney, Agent, or Firm* — Jacobson Holman PLLC

(57) ABSTRACT

The invention relates to a method for preparing multiple metal oxides and intermediate compound, i.e. spherical nickelous hydroxide which is lopped. The intermediate compound is prepared by: mixing bivalent nickel salt, cobalt salt, ammonia water and ammonium salt to form solution containing complex; then adding the said solution containing complex with the mixture solution of metal salt(s) and alkali into reaction vessel in parallel flow, stirring to form precipitate of spherical nickelous hydroxide which is dopped, and washing to remove the impurities. The resulting spherical nickelous hydroxide which is dopped, as an intermediate compound, can be used to produce multiple metal oxides. The resulting multiple metal oxides can be used as anode active material. The spherical nickelous hydroxide has advantages of uniform size and narrow size distribution. The multiple metal oxides has high electric conductivity and cycle performance, particularly, is suitable to be used as anode material.

4 Claims, 3 Drawing Sheets on the spherical doped nickelous hydroxide, by which the spherical doped nickelous hydroxide has a regular structure and a narrow particle size distribution, the particle size is easy to be controlled, and an industrialized production is made possible.

METHOD FOR PREPARING SPHERICAL NICKELOUS HYDROXIDE WHICH IS DOPPED AND MULTIPLE METAL OXIDES, AND LITHIUM ION SECONDARY BATTERY

This is a national stage of International application no. PCT/CN2005/000931 filed on Jun. 27, 2005 and published in Chinese.

FIELD OF THE INVENTION

The present invention belongs to the high-energy electrochemistry field, and relates particularly to a method for preparing a spherical doped nickelous hydroxide and a multimetal oxide, and a lithium ion battery.

BACKGROUND OF THE INVENTION

Currently a lithium ion battery has an extensive application in such electronic devices as mobile telephones, portable computers, and portable audio-visual equipment. However, a price of its anode material, lithium cobalt oxide ($LiCoO_2$), is going up continuously because of resource problems, which limits development of the lithium ion battery. Therefore, people have been working hard to look for a suitable substitute material. The material recently studied most is such composite anode materials as cobalt nickel manganese. The most widely used method reported in literature is a codeposition method. According to this method, prepare a metal salt solution according to a certain proportion; add such additives as ammonia water to control crystallization velocity of a hydroxide; and then react with an alkali to produce a deposit. In accordance with this method, add ammonia water into a base solution; after the salt solution is dripped into the base solution, first such metallic ions as $Ni^{2+}$ and $Co^{2+}$ have a complexation with ammonia ($NH_3$) to produce a complex ion of $X(NH_3)_n^{2+}$ (n=1~6, X=Ni, Co), concentration of the metallic ion being lowered; then amount of $Ni^{2+}$ and $Co^{2+}$ is dramatically reduced due to their reaction with $OH^-$ to produce a hydroxide deposit; and then $M(NH_3)_n^{2+}$ releases the complex metallic ions to keep a certain concentration of the metallic ions in the solution. However, this method has the following shortcoming: After the salt solution is added into the base solution, ammonia ($NH_3$) and $OH^-$ coexist with the metallic ions, resulting in a competitive behavior; and it is very difficult for ammonia ($NH_3$) to control crystallization due to the fact that it is easier for $OH^-$ than $NH_3$ to react with such ions as $Ni^{2+}$ and $Co^{2+}$, which makes the intermediate particles have an irregular microstructure and a wider size distribution.

Umicore, Belgium thinks that the material with a bigger particle size has a poorer cycling performance. According to the research done by Guoliang Wu et al., particle size distribution of the material has a remarkable influence on the discharge capacity, especially on the charge-discharge cycling performance; and the wider the particle size distribution, the poorer the cycling performance. The reason is that, the material with a wider particle size distribution will have a poor porosity, which affects its capillarity with an electrolyte and thus makes the impedance show higher; and when the battery is charged to an extreme potential, $Li^+$ on surface of a big particle will deintercalate excessively, which will damage its layered structure and is to the disadvantage of the cycling performance.

SUMMARY OF THE INVENTION

Aiming at the shortcoming of the above method, a purpose of the present invention is to provide a method for preparing the spherical doped nickelous hydroxide, by which the spherical doped nickelous hydroxide has a regular structure and a narrow particle size distribution, the particle size is easy to be controlled, and an industrialized production is made possible.

Another purpose of the present invention is to provide a multi-metal oxide with high electrical conductivity and good cycling performances as well as its preparation method.

Still another purpose of the present invention is to provide an anode material of the lithium ion battery with high electrical conductivity and good cycling performance as well as a lithium ion secondary battery.

The technical solution for realizing the above-mentioned purposes is as below:

A method for synthesizing the spherical doped nickelous hydroxide is provided, including the following steps:

1) First mix a bivalent nickel salt and a bivalent cobalt salt with ammonia water and an ammonium salt to produce a complex solution; and 2) then add the complex solution produced in Step 1) and a mixed solution of a metal salt and an alkali solution into a reaction vessel in parallel flow, stir to produce deposit of the spherical doped nickelous hydroxide, and wash away impurity ions.

It is preferred that the metal salt is chosen from an aluminum salt, a magnesium salt, or a mixture of the two. The aluminum salt and the magnesium salt are preferred to be a nitrate or an acetate.

It is preferred that, concentration of ammonia water in Step 1) is 0.1~1 mol/L, and concentration of the ammonium salt 0.02~0.25 mol/L. The molar ratio of ammonia water to the ammonium salt is 4:1~5:1, the acid group of the ammonium salt being the same to that of the nickel salt and the cobalt salt.

It is preferred that, the nickel salt and the cobalt salt are a sulfate, a nitrate, a chloride or an acetate, while the alkali solution is NaOH or KOH; and the molar ratio of total of the nickel salt, the cobalt salt, and the dopant metal salt to the alkali solution is 1:2.1~1:2.4.

It is preferred that, there is further a base solution in the reaction vessel; the base solution is a mixed buffer solution of ammonia water and the ammonium salt, with concentration of ammonia water in the base solution being lower than that in Step 1); and amount of the base solution is such that lower end of a stirring paddle can just be stretched into the base solution on bottom of the vessel and stir the base solution. Concentration of ammonia water in the base solution is preferred to be half of that in Step 1). The stirring velocity is preferred to be 100~600 r/min.

A method for preparing the multi-metal oxide is also provided for the purposes of the present invention. That is, dry deposit of the spherical doped nickelous hydroxide prepared by the above-mentioned method, mix it uniformly with lithium hydroxide, and obtain the finished product by high-temperature sintering.

It is preferred that, the molar ratio of total of the nickel salt, the cobalt salt, and the metal salt to the single-water lithium hydroxide is 1:1.02~1:1.07; when the metal salt is chosen from an aluminum salt, a magnesium salt, or a mixture of the two, total of the metal salt is the total of Ni, Co and Al, or the total of Ni, Co and Mg, or the total of Ni, Co, Al and Mg.

It is preferred that, the stirring velocity for mixing is 100~600 r/min, and the drying temperature 150~200° C.; the high-temperature sintering is performed at 700~800° C., and the sintering duration is 12~24 hours.

The present invention further provides a lithium ion secondary battery, whose anode active material contains the multi-metal oxide prepared by the above-mentioned method.

And the present invention still further provides a multi-metal oxide with an expression of $LiCo_aNi_bM_{1-a-b}O_2$, where M stands for aluminum or magnesium, $a=0.03\sim0.15$, and $b=0.6\sim0.82$.

The above-mentioned multi-metal oxide is suitable as anode material of the lithium ion battery.

By adopting the above technical solution, the beneficial technical effects of the present invention are as below with reference to the following embodiments to be illustrated in detail:

1) Dope with the metallic ions when producing a spherical nickel intermediate, making the dopant metallic ions produce a more uniform mixed hydroxide intermediate material in liquid phase with cobalt and nickel; during the high-temperature sintering process of this intermediate, the dopant ions can better go into a void among unit cells of the material, which improves stability of the layered deintercalation structure, and restrains or decelerates phase transition during the charge-discharge process;

2) while preparing the spherical doped nickelous hydroxide, since before codeposition mix the bivalent nickel salt and cobalt salt with ammonia water and the ammonium salt to produce the complex solution (a buffer solution around pH=7 can be produced with the ammonium salt and ammonia water; there will appear no deposit in the complex solution, whose main purpose is to prevent cobalt from depositing), and then add the complex solution and the mixed solution of the dopant metal salt and the alkali solution into the reaction vessel in parallel flow to produce deposit of the spherical doped nickelous hydroxide, this method effectively prevents the problem that particles are difficult to grow up into a sphere due to direct addition of the alkali solution;

3) in view of the fact that the complex solution and the mixture of the salt and the alkali solution are added into the reaction vessel in parallel flow to produce deposit of the spherical doped nickelous hydroxide, as long as the flow velocity is kept constant, pH value in the reaction vessel can be kept constant without the problem that the pH value rises; therefore, by the method of the present invention, the velocity at which the spherical doped nickelous hydroxide is prepared in the reaction vessel and the uniform particle size can be guaranteed, size of the intermediate effectively controlled, and a narrow particle size distribution of the synthesized intermediate obtained;

4) because the reaction vessel is added with the mixed buffer base solution of ammonia water and the ammonium salt, it is guaranteed that right from the beginning of feeding, the complex solution and the alkali solution can be stirred uniformly; and presence of the buffer base solution can guarantee that fluctuation of the pH value is very small when the reaction begins;

5) it can be seen with reference to embodiments and data to be described in detail below that, the multi-metal oxide ($LiCo_aNi_bM_{1-a-b}O_2$) prepared by the method of the present invention has a uniform particle size distribution, with the particle size being about 6~10 μm, the first charge-discharge specific capacity up to 170 mAh/g, the first charge-discharge efficiency close to 80%, and a tap density 2.4 g/cm$^3$, keeping both a higher specific capacity and a higher tap density; according to an experiment with a button battery, the multi-metal oxide shows good cycling performance, with a specific capacity of 120 mAh/g remaining after 100 cycling times; it has high-voltage resistance and can be charged up to 4.5 V, with good safety performance; and 6) because the above-mentioned controlled crystallization method is adopted for preparing the spherical doped nickelous hydroxide, the process is simple and easy to be controlled, there is no need for "emptying" the reaction vessel, a continuous production is possible with a high production efficiency, and a large-scale production is feasible.

The present invention will be further described below in detail with reference to drawings and embodiments.

BRIEF DESCRIPTION OF THE DRAWINGS

FIG. 5 is a cycling performance curve of a battery made from the multi-metal oxide prepared with the product.

DETAILED DESCRIPTION OF THE EMBODIMENTS

Figure 1:
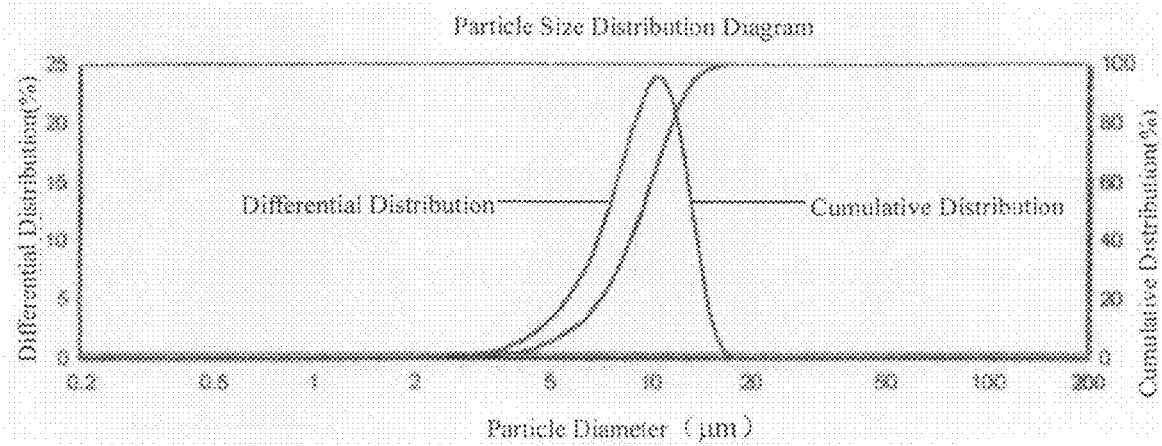
FIG. 1 is a particle size analysis diagram of the spherical doped nickelous hydroxide (hereinafter referred to as "the product").

The present invention provides a method for synthesizing the spherical doped nickelous hydroxide, including the following steps: 1) First mix a bivalent nickel salt and a bivalent cobalt salt with ammonia water and an ammonium salt to form a complex solution; and 2) add the complex solution produced in Step 1) and a mixed solution of a metal salt and an alkali solution into a reaction vessel in parallel flow, stir to produce deposit of the spherical doped nickelous hydroxide, and wash away impurity ions. The produced spherical doped nickelous hydroxide (hereinafter referred to as "the doped spherical nickel") can be expressed by the chemical formula, $Ni_bCo_aM_{(1-a-b)}(OH)_n$, where M stands for metal element in the dopant metal salt that can be Al, Mg or their mixture. The produced spherical doped nickelous hydroxide, as an intermediate, can be used to produce the multi-metal oxide, $LiCo_aNi_bM_{1-a-b}O_2$. That is, dry deposit of the doped spherical nickel prepared by the above-mentioned method, mix it uniformly with lithium hydroxide, and obtain the finished product by high-temperature sintering. The produced multi-metal oxide can be used for preparing an anode active material of the lithium ion battery. The implementation and effects of the present invention are explained in detail below with reference to embodiments.

Embodiment 1

Doped Spherical Nickel Intermediate
$Ni_{0.75}Co_{0.10}Al_{0.15}(OH)_n$

Method for preparing the above-mentioned doped spherical nickel intermediate: Add a complex salt solution of nickel sulfate and cobalt sulfate with ammonia water and ammonium sulfate, as well as NaOH added with aluminum sulfate into a 40 L reaction kettle in parallel flow, the molar ratio of $Ni^{2+}$ to $Co^{2+}$ being 0.75:0.10, total concentration of the salts 0.85 mol/L, concentration of ammonia 0.8 mol/L, concentration of ammonium sulfate 0.18 mol/L, concentration of NaOH 2.3 mol/L, concentration of aluminum sulfate 0.15 mol/L. The base solution is a mixed solution of ammonia and ammonium sulfate, concentration of ammonia being 0.4 mol/L, concentration of the ammonium salt 0.09 mol/L. Amount of the base solution is such that a stirring paddle can just stir the base solution. The feeding velocity is controlled at 1 L/h, the reaction temperature 50° C., the pH value 11.5, and the stirring velocity 600 r/min. The dark green spherical nickel intermediate $Ni_{0.75}Co_{0.10}Al_{0.15}(OH)_n$ can be obtained by codeposition. Age for 2 h, wash away $SO_4^{2-}$ with distilled water for 5~7 times, dry for 12 hours in an oven at 60° C., mill with a ball mill, sift, and obtain a precursor material.

Structure and properties of the product prepared in this embodiment can be characterized through the following means: Use an X Ray Diffractometer (XRD) to determine physical phase of the particle, and a Scanning Electron Microscope (SEM) to directly observe shape and size of the product.

As shown in FIG. 1, this product has a narrower particle size distribution with the particle diameter at 10 μm, which shows that the particle has a more uniform particle diameter.

Figure 2:
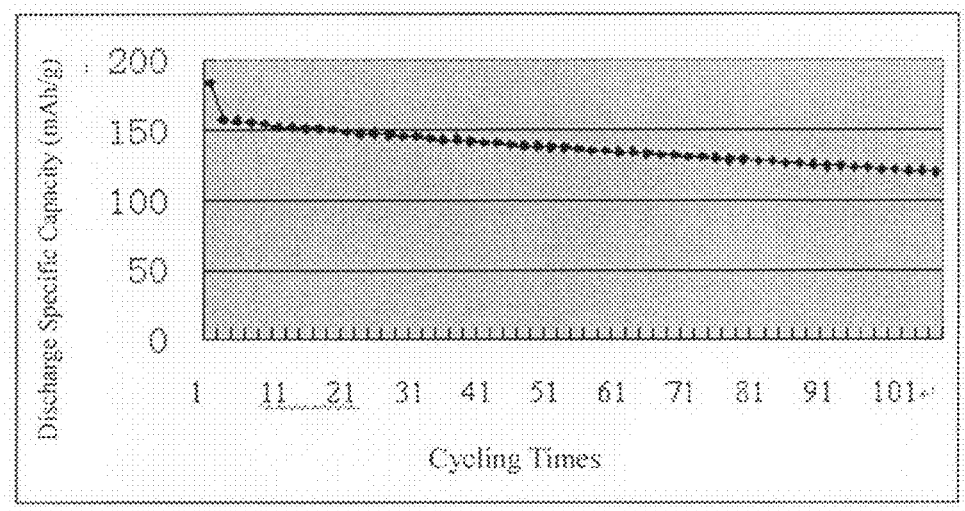
FIG. 2 is an XRD spectrogram of the product particle phase obtained by an X Ray Diffractometer (XRD).
Figure 2:
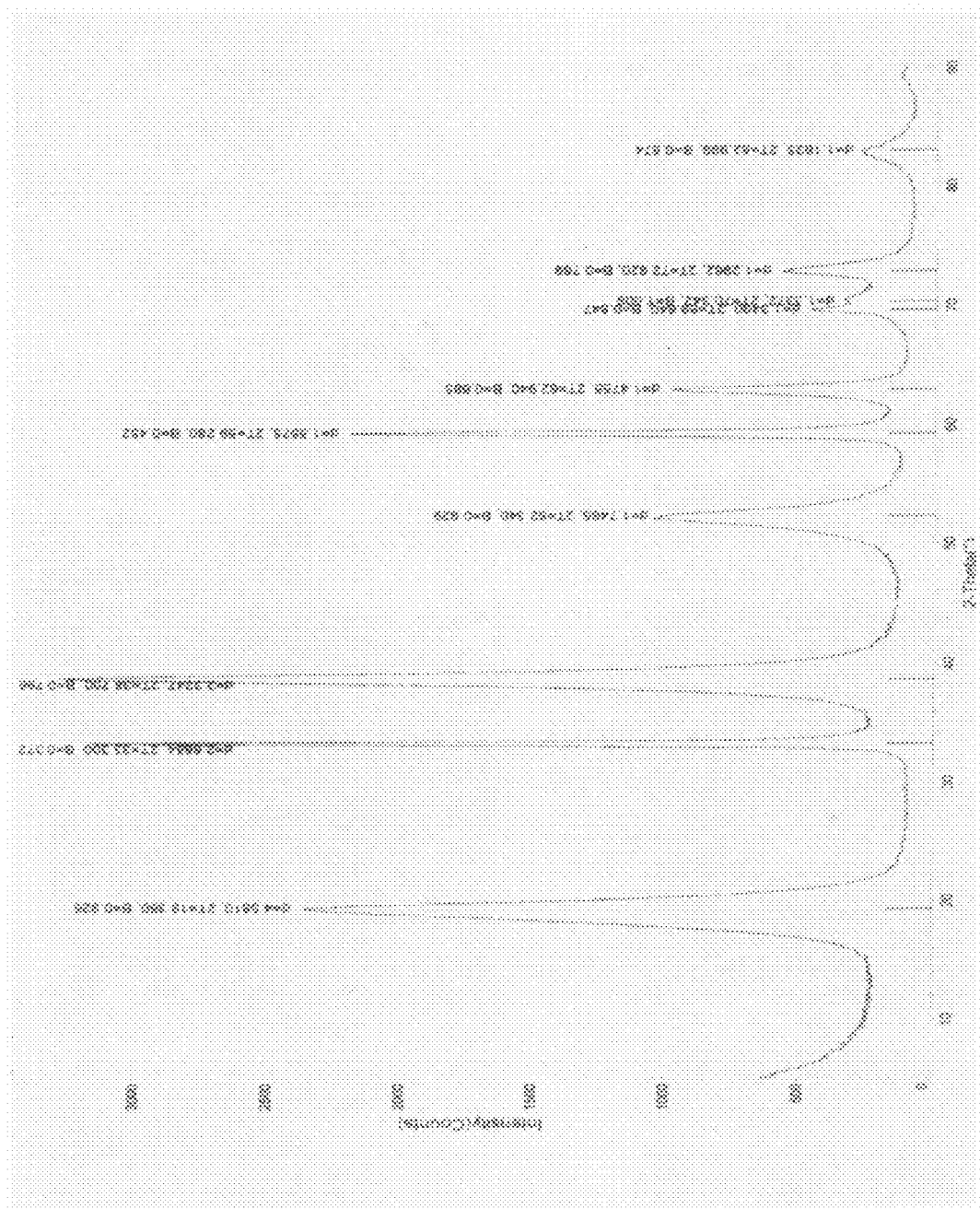

In view of position and number of a diffraction peak on the XRD spectrogram of particle phase of the product as shown in FIG. 2, there is no impurity peak, showing that no other impurity phase is resulted from doping and the product has a regular layered structure.

Figure 3:
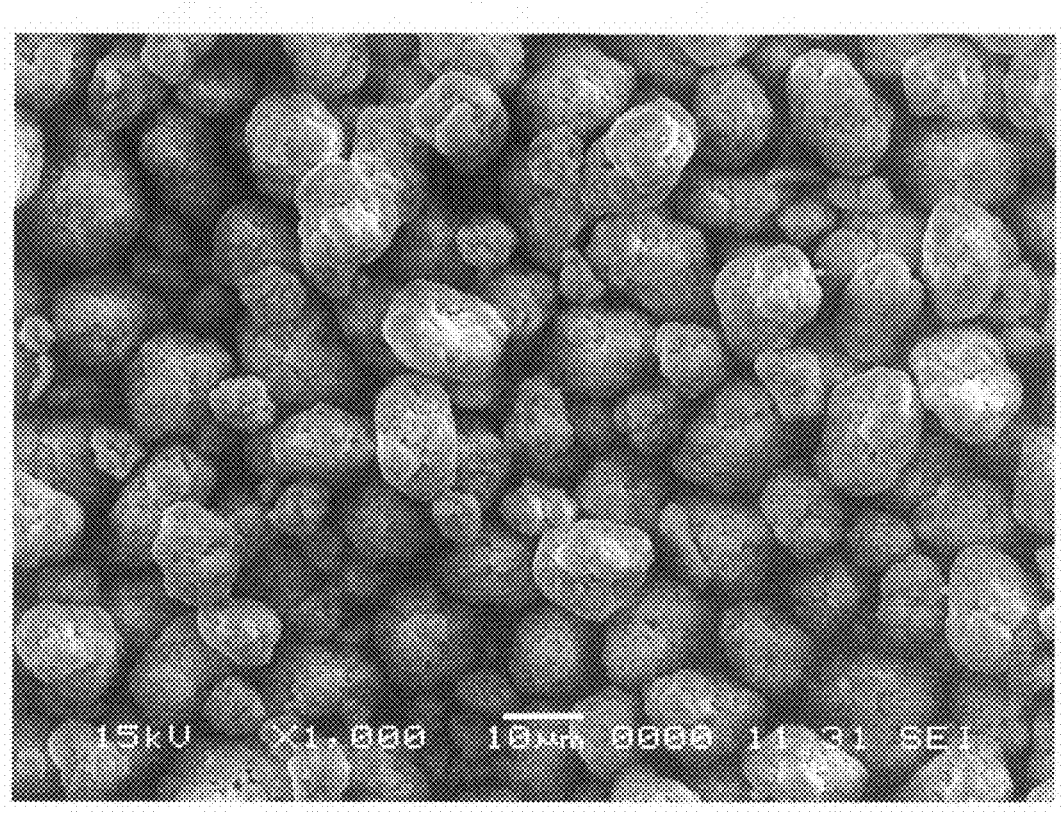
FIG. 3 is an SEM photograph of the product particle taken by a Scanning Electron Microscope (SEM).

It can be seen from the SEM photograph of the product particle as shown in FIG. 3 that particles of the product are nearly spherical, a spherical shape being advantageous for full usage of the capacity.

Embodiment 2

Doped Spherical Nickel Intermediate $Ni_{0.75}Co_{0.10}Al_{0.15}(OH)_n$

The method of this embodiment is basically the same with that of Embodiment 1, except that the nickel salt, the cobalt salt, the ammonium salt and the aluminum salt of this embodiment are an acetate, the alkali is KOH, and the stirring velocity 300 r/min. Other conditions and preparation methods are the same with those in Embodiment 1. The dark green spherical nickel intermediate $Ni_{0.75}Co_{0.10}Al_{0.15}(OH)_n$ can be obtained by codeposition. Age for 2 h, wash away the acetate ion with distilled water for 5~7 times, dry for 12 hours in the oven at 60° C., mill with the ball mill, sift, and obtain the precursor material.

Embodiment 3

Doped Spherical Nickel Intermediate $Ni_{0.75}Co_{0.10}Al_{0.15}(OH)_n$

The method of this embodiment is basically the same with that of Embodiment 1, except that concentration of ammonia in this embodiment is 1 mol/L, concentration of ammonium sulfate 0.25 mol/L, and concentration of ammonia in the base solution 0.5 mol/L. Other conditions and preparation methods are the same with those in Embodiment 1. The dark green spherical nickel intermediate $Ni_{0.75}Co_{0.10}Al_{0.15}(OH)_n$ can be obtained by codeposition.

Embodiment 4

Doped Spherical Nickel Intermediate $Ni_{0.75}Co_{0.10}Al_{0.15}(OH)_n$

The method of this embodiment is basically the same with that of Embodiment 1, except that concentration of ammonia in this embodiment is 0.1 mol/L, concentration of ammonium sulfate 0.02 mol/L, concentration of ammonia in the base solution 0.05 mol/L, and the stirring velocity 100 r/min. Other conditions and preparation methods are the same with those in Embodiment 1. The dark green spherical nickel intermediate $Ni_{0.75}CO_{0.10}Al_{0.15}(OH)_n$ can be obtained by codeposition.

Embodiment 5

Doped Spherical Nickel Intermediate $Ni_{0.6}Co_{0.03}Al_{0.37}(OH)_n$

Method for preparing the above-mentioned doped spherical nickel intermediate: This embodiment is different from Embodiment 1 in that a=0.03 and b=0.6, that is, the molar ratio of $Ni^{2+}$ to $Co^{2+}$ is 0.6:0.03, total concentration of the salts 0.97 mol/L, and the molar ratio of nickel and cobalt to aluminum 0.63:0.37. Other conditions and preparation methods are the same with those in Embodiment 1.

Embodiment 6

Doped Spherical Nickel Intermediate $Ni_{0.82}Co_{0.15}Mg_{0.03}(OH)_2$

Method for preparing the above-mentioned doped spherical nickel intermediate: Add a complex salt solution of nickel sulfate, cobalt sulfate and magnesium nitrate with ammonia water and ammonium sulfate, and NaOH into a 40 L reaction kettle in parallel flow, the molar ratio of $Ni^{2+}$ to $Co^{2+}$ to $Mg^{2+}$ being 0.82:0.15:0.03, total concentration of the salts 1 mol/L, concentration of ammonia 0.8 mol/L, concentration of ammonium sulfate 0.4 mol/L, concentration of NaOH 2.4 mol/L. The base solution is a mixed solution of ammonia and ammonium sulfate, concentration of ammonia being 0.4 mol/L, concentration of the ammonium salt 0.09 mol/L. Amount of the base solution is such that the stirring paddle can just stir the base solution. The feeding velocity is controlled at 1 L/h, the reaction temperature 50° C., the pH value 11.5, and the stirring velocity 600 r/min. A dark green spherical doped polyoxide $Ni_{0.82}Co_{0.15}Mg_{0.03}(OH)_2$ can be obtained by codeposition.

Embodiment 7

Doped Spherical Nickel Intermediate $Ni_{0.82}Co_{0.15}Al_{0.02}Mg_{0.01}(OH)_n$ Method for preparing the above-mentioned intermediate: This embodiment is different from Embodiment 6 in that the dopant metal magnesium is replaced with aluminum and magnesium, the molar ratio of $Ni^{2+}$ to $Co^{2+}$ to $Al^{3+}$ to $Mg^{2+}$ n the mixed salt solution is 0.82:0.15:0.02:0.01, total concentration of the salts 1 mol/L, concentration of ammonia 0.4 mol/L, and concentration of ammonium sulfate 0.72 mol/L. The salt solution and NaOH are added into the 40 L reaction kettle in parallel flow, concentration of NaOH being 2.3~2.4 mol/L. The base solution is a mixed solution of ammonia and ammonium sulfate, concentration of ammonia being 0.2 mol/L, concentration of the ammonium salt 0.09 mol/L. Amount of the base solution is such that the stirring paddle can just stir the base solution. The feeding velocity is controlled at 1 L/h, the reaction temperature 50° C., the pH value 11.5, and the stirring velocity 600 r/min. A dark green spherical doped polyoxide $Ni_{0.82}Co_{0.15}Al_{0.02}Mg_{0.01}(OH)_n$ can be obtained by codeposition. Age for 2 h, wash away $SO_4^{2-}$ with distilled water for 5~7 times, dry for 12 hours in the oven at 60° C., mill with the ball mill, sift, and obtain the precursor material. Measure its humidity accurately. Mill with the ball mill and mix uniformly according to the molar ratio of $Ni_{0.82}CO_{0.15}Al_{0.02}Mg_{0.01}(OH)_n$ to LiOH at 1:1.06, put into a crucible, place into an electric resistance furnace, heat up to 250° C. at a temperature rising velocity of 5° C./min, keep the temperature for 2 h, then continue to heat up to 700° C. and keep constant for 12 h, take out of the crucible when the temperature declines below 200° C., grind with the ball, and then obtain the anode material of the lithium ion battery with high capacity, high-voltage resistance, and good cycling performance.

Embodiment 8

Synthesis of the Multi-Metal Oxide $LiCo_{0.10}Ni_{0.75}Al_{0.15}O_2$

Mill the material synthesized in Embodiment 1 with the ball mill and mix uniformly according to the molar ratio of $Ni_{0.82}Co_{0.015}Al_{0.02}Mg_{0.01}(OH)_n$ to LiOH at 1:1.06, put into the crucible, place into the electric resistance furnace, heat up to 250° C. at the temperature rising velocity of 5° C./min, keep the temperature for 2 h, then continue to heat up to 700° C. and keep constant for 12 h, take out of the crucible when the temperature declines below 200° C., grind with the ball, and then obtain the multi-metal oxide with high capacity, high-voltage resistance, and good cycling performance.

Manufacture a button lithium ion battery with this multi-metal oxide according to normal processes, and test its electrochemical performance.

Figure 4:
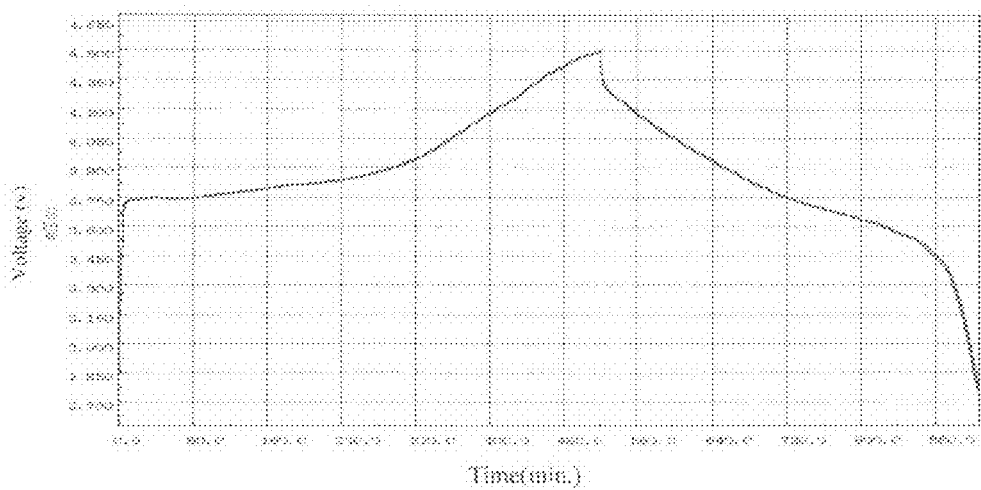
FIG. 4 is a first charge-discharge curve of a battery made from the multi-metal oxide prepared with the product.

It can be seen from the first charge-discharge curve as shown in FIG. 4 that, the manufactured product has high-voltage resistance, and can be charged up to 4.5 V, with good safety performance. The specific capacity of the first charge is 210 mAh/g, the specific capacity of discharge 170 mAh/g, with a charge-discharge efficiency at 81%.

According to the cycling performance curve of the product as shown in FIG. 5, there is a greater capacity attenuation from the first to the second cycle, which however also provides a sufficient lithium source for forming an SEI film on the cathode surface. The capacity retention rate in a following cycle is all above 99%, and the specific capacity still remains above 120 mAh/g after cycling for 100 times. It can thus be seen that, the multi-metal oxide of the present invention is an anode material of the lithium ion battery with high electrical conductivity and good cycling performance.

The invention claimed is:

1. A method for preparing a multi-metal oxide, wherein it comprises the following steps:
    1) first mixing a bivalent nickel salt and a bivalent cobalt salt with ammonia water and an ammonium salt to form a complex solution; and
    2) then adding the complex solution produced in Step 1) and a mixed solution of a metal salt and an alkali solution into a reaction vessel in parallel flow, stirring to produce deposit of the spherical doped nickelous hydroxide, and washing away impurity ions;
    3) drying the deposit of the spherical doped nickelous hydroxide, mixing it uniformly with lithium hydroxide monohydrate, and obtaining the finished product by high-temperature sintering;
    wherein the molar ratio of the ammonia water to the ammonium salt is 4:1~5:1, the acid group of the ammonium salt being the same to that of the nickel salt and the cobalt salt.

2. The method for preparing the multi-metal oxide according to claim 1, wherein the molar ratio of total of the nickel salt, the cobalt salt, and the metal salt to the lithium hydroxide monohydrate is 1:1.02~1:1.07.

3. A method for preparing a multi-metal oxide, wherein it comprises the following steps:
    1) first mixing a bivalent nickel salt and a bivalent cobalt salt with ammonia water and an ammonium salt to form a complex solution; and
    2) then adding the complex solution produced in Step 1) and a mixed solution of a metal salt and an alkali solution into a reaction vessel in parallel flow, stirring to produce deposit of the spherical doped nickelous hydroxide, and washing away impurity ions;
    3) drying the deposit of the spherical doped nickelous hydroxide, mixing it uniformly with lithium hydroxide monohydrate, and obtaining the finished product by high-temperature sintering;
    wherein the molar ratio of total of the nickel salt, the cobalt salt, and the metal salt to the alkali solution is 1:2.1~1:2.4.

4. The method for preparing the multi-metal oxide according to claim 3, wherein the molar ratio of total of the nickel salt, the cobalt salt, and the metal salt to the lithium hydroxide monohydrate is 1:1.02~1:1.07.

* * * * *